3,549,655
N-(SUBSTITUTED PHENYL) CYCLOBUTANE-
DICARBOXIMIDES
Donald E. Bublitz, Concord, Calif., assignor to The Dow
Chemical Company, Midland, Mich., a corporation of
Delaware
No Drawing. Filed Dec. 21, 1967, Ser. No. 692,259
Int. Cl. C07d 27/10
U.S. Cl. 260—326.5                              10 Claims

ABSTRACT OF THE DISCLOSURE

N-(substituted phenyl)-1,2-cyclobutanedicarboximides are prepared by the reaction of 1,2-cyclobutane-dicarboxylic anhydride with a substituted aniline. The compounds are useful as plant growth control agents, pesticides and as central nervous system depressants.

SUMMARY OF THE INVENTION

This invention is concerned with substituted cyclobutanedicarboximides and is particularly directed to N-(substituted phenyl)-1,2-cyclobutanedicarboximides corresponding to the formula:

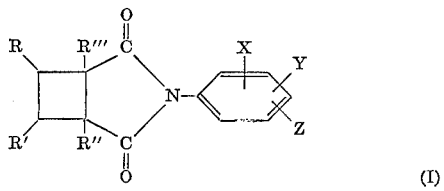

(I)

In the following specification and claims, R and R' each independently represent hydrogen or methyl, R" and R'" both represent hydrogen when either or both of R and R' represent methyl, R" and R'" both represent hydrogen or methyl when both R and R' represent hydrogen, X represents halogen, trifluoromethyl, dimethylamino, methylthio or methoxy, Y represents hydrogen, trifluoromethyl or halogen and Z represents hydrogen or methoxy. In the present specification and claims, the terms "halo" and "halogen" refer to fluorine, chlorine and bromine.

The novel compounds are crystalline solids which are of varying degrees of solubility in organic solvents such as benzene, chloroform, methylene chloride and alcohols and which are slightly soluble in water.

The N-(substituted phenyl)-1,2-cyclobutanedicarboximides of the invention have been found to be useful for administration to laboratory animals in the examination of the behavior thereof and in the study of drug effects on the central and peripheral nervous systems. They are particularly useful as sedatives, anticonvulsants and for prolonging the effects of barbiturates. The compounds are also useful in the control of plant growth and as pesticides for the control of such organisms as nematodes and trash fish. For such uses, the compounds wherein R, R', R" and R'" are hydrogen are preferred. The N-(substituted phenyl) - 1,2 - cyclobutanedicarboximides wherein X and Y are halogen or trifluoromethyl and Z is hydrogen are further preferred compounds. A further preferred group of compounds consists of the N-(halophenyl)-1,2-cyclobutanedicarboximides and the N-(dihalophenyl)-1,2-cyclobutanedicarboximides.

The novel compounds can be prepared by the reaction of a substituted aniline with a substituted 1,2-cyclobutane-dicarboxylic anhydride corresponding to the formula

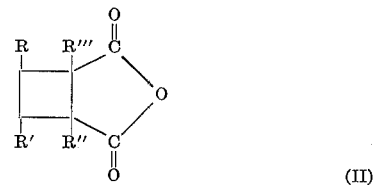

(II)

wherein R, R', R" and R'" have the significance set out above with respect to Formula I. Representative substituted 1,2-cyclobutanedicarboxylic anhydride starting materials are 1,2-cyclobutanedicarboxylic anhydride, 3-methyl-1,2-cyclobutanedicarboxylic anhydride, 3,4-dimethyl-1,2-cyclobutanedicarboxylic anhydride and 1,2-dimethyl-1,2-cyclobutanedicarboxylic anhydride. The reaction proceeds when the reactants are contacted and mixed with the production of water of reaction. The reaction is preferably carried out in the absence of a solvent; however, it can also be carried out in an inert organic solvent as a reaction medium. Representative inert organic solvents which can be employed as reaction media include halobenzenes and halogenated hydrocarbons. The reaction proceeds at temperatures of from about −10° C. to 200° C. and is preferably carried out at the boiling point of the reaction mixture under reflux. When no solvent is employed, the reaction is carried out at a temperature sufficient to effect the removal of the water of reaction from the reaction mixture. In such cases, the reaction should generally be carried out at temperatures from 100° to 200° C. The exact proportion of the reactants to be employed is not critical, some of the desired product being obtanied when the reactants are employed in any proportions; however, the reaction consumes the reactants in equimolar proportions and the reactants are preferably employed in such proportions. The reaction is generally complete in about 0.25 to 2 hours depending upon the reaction temperature employed. The product can be separated from the reaction mixture by conventional procedures such as evaporation or distillation to remove the inert organic solvent reaction medium and the product can be purified by conventional procedures such as washing, chromatography, recrystallization and the like.

In a convenient procedure, a substituted aniline and a substituted 1,2-cyclobutanedicarboxylic anhydride corresponding to Formula II are mixed together in any order or fashion. The mixture is heated at a temperature within the reaction temperature range for a period of time sufficient for the reaction to go to completion. In a convenient procedure, the evolution of water of reaction is employed as an indication of the progress of the reaction. The reaction mixture is cooled and the product obtained by recrystallization. In cases in which an inert organic solvent is employed, the mixture is washed with an aqueous solution of base such as sodium carbonate to remove unreacted cyclobutanedicarboxylic anhydride starting material. The product can then be separated by evaporation of the solvents in vacuo. The product thus prepared can be administered to animals, employed to treat plants or employed in pesticidal operations, or it can be further purified by conventional procedures such as recrystallization.

DESCRIPTION OF THE PREFERRED EMBODIMENTS

In a representative operation, 4-chloroaniline (6.3 grams; 0.05 mole) is mixed with 1,2-cyclobutanedicarboxylic anhydride (6.4 grams; 0.05 mole). The resulting mixture is heated at the boiling point for about 2 to 5 minutes during which time water of reaction is driven off. The mixture is cooled and recrystallized from ethanol. The N-(4-chlorophenyl)-1,2 - cyclobutanedicarboximide product is obtained as a crystalline solid which is found to melt at 171°–172° C.

In substantially the same procedure, the following compounds of the invention are prepared.

N-(4-bromophenyl) - 1,2 - cyclobutanedicarboximide, melting at 164° C., is prepared by reacting together equimolar proportions of 4-bromoaniline and 1,2-cyclobutanedicarboxylic anhydride.

N-(3-chlorophenyl) - 1,2 - cyclobutanedicarboximide, melting at 110° C., is prepared by reacting together equimolar proportions of 3-chloroaniline and 1,2-cyclobutanedicarboxylic anhydride.

N-(3-fluorophenyl) - 1,2 - cyclobutanedicarboximide, melting at 103° C., is prepared by reacting together equimolar proportions of 3-fluoroaniline and 1,2-cyclobutanedicarboxylic anhydride.

N-(4-dimethylaminophenyl) - 1,2 - cyclobutanedicarboximide, melting at 134° C., is prepared by reacting together equimolar proportions of 4-dimethylaminoaniline and 1,2-cyclobutanedicarboxylic anhydride.

N-(2,4-dimethoxy-5-chlorophenyl) - 1,2 - cyclobutanedicarboximide, melting at 138° C., is prepared by reacting together equimolar proportions of 2,4-dimethoxy-5-chloroaniline and 1,2-cyclobutanedicarboxylic anhydride.

N-(2,3-dichlorophenyl) - 1,2-cyclobutanedicarboximide, melting at 111° C., is prepared by reacting together equimolar proportions of 2,3-dichloroaniline and 1,2-cyclobutanedicarboxylic anhydride.

N-(2,4-dichlorophenyl) - 1,2 - cyclobutanedicarboximide, melting at 120° C., is prepared by reacting together equimolar proportions of 2,4-dichloroaniline and 1,2-cyclobutanedicarboxylic anhydride.

N-(2,5-dichlorophenyl) - 1,2 - cyclobutanedicarboximide, melting at 175° C., is prepared by reacting together equimolar proportions of 2,5-dichloroaniline and 1,2-cyclobutanedicarboxylic anhydride.

N-(3,5-dichlorophenyl) - 1,2 - cyclobutanedicarboximide, melting at 176° C., is prepared by reacting together equimolar proportions of 3,5-dichloroaniline and 1,2-cyclobutanedicarboxylic anhydride.

N-(3,4-dichlorophenyl) - 1,2 - cyclobutanedicarboximide, melting at 187° C., is prepared by reacting together equimolar proportions of 3,4-dichloroaniline and 1,2-cyclobutanedicarboxylic anhydride.

N-(4-methylthiophenyl) - 1,2 - cyclobutanedicarboximide, melting at 113° C., is prepared by reacting together equimolar proportions of 4-methylthioaniline and 1,2-cyclobutanedicarboxylic anhydride.

N-[3,5-di(trifluoromethyl)phenyl] - 1,2-cyclobutanedicarboximide, melting at 157° C., is prepared by reacting together equimolar proportions of 3,5-di(trifluoromethyl)aniline and 1,2-cyclobutanedicarboxylic anhydride.

N-[4-(trifluoromethyl)phenyl] - 1,2-cyclobutanedicarboximide, melting at 150° C., is prepared by reacting together equimolar proportions of 4-(trifluoromethyl)aniline and 1,2-cyclobutanedicarboxylic anhydride.

N-(4-chlorophenyl)-3-methyl - 1,2 - cyclobutanedicarboximide, having a molecular weight of 250, is prepared by reacting together equimolar proportions of 4-chloroaniline and 3-methyl-1,2-cyclobutanedicarboxylic anhydride.

N-(3-fluorophenyl)-3,4-dimethyl - 1,2-cyclobutanedicarboximide, having a molecular weight of 248, is prepared by reacting together equimolar proportions of 3-fluoroaniline and 3,4-dimethyl - 1,2-cyclobutanedicarboxylic anhydride.

N-(3-chlorophenyl) - 3,4-dimethyl-1,2-cyclobutanedicarboximide, having a molecular weight of 264, is prepared by reacting together equimolar proportions of 3-chloroaniline and 3,4-dimethyl - 1,2-cyclobutanedicarboxylic anhydride.

N-(4-chlorophenyl)-3,4-dimethyl - 1,2-cyclobutanedicarboximide, having a molecular weight of 264, is prepared by reacting together equimolar proportions of 4-chloroaniline and 3,4-dimethyl-1,2 - cyclobutanedicarboxylic anhydride.

N-(3,4-dibromophenyl) - 1,2-dimethyl-1,2-cyclobutanedicarboximide, having a molecular weight of 388, is prepared by reacting together equimolar proportions of 3,4-dibromoaniline and 1,2-dimethyl-1,2-cyclobutanedicarboxylic anhydride.

The N-(substituted phenyl)-1,2-cyclobutanedicarboximides of the present invention are employed as the active ingredients in compositions to be employed for controlling the growth of various plants. They are particularly useful as selective herbicides.

For such uses, the compounds can be employed in an unmodified form or dispersed on a finely divided solid and employed as dusts. Such mixtures can also be dispersed in water with or without the aid of a surface active agent and the resulting aqueous suspensions employed as drenches or sprays. In other procedures, the products are employed as active constituents in solvent solutions, oil-in-water and water-in-oil emulsions or aqueous dispersions. The augmented compositions are adapted to be formulated as concentrates and subsequently diluted with additional liquid or solid adjuvants to produce the ultimate treating compositions.

In representative operations, substantially complete controls of the growth of bean plants are obtained when separate aqueous compositions each containing one of the compounds, N-(4-bromophenyl)-1,2-cyclobutanedicarboximide and N-(4-chlorophenyl)-1,2-cyclobutanedicarboximide, as the sole toxicant therein and in an amount sufficient to provide a toxicant concentration equiavlent to 75 pounds per acre are added to areas of soil containing viable seeds of beans. In other operations, separate liquid compositions each containing one of N-(2,5-dichlorophenyl)-1,2 - cyclobutanedicarboximide and N-[3,5-d] (trifluoromethyl)phenyl-1,2 - cyclobutanedicarboximide as the sole toxicant therein and in an amount sufficient to provide a toxicant concentration equivalent to 75 pounds per acre when added to areas of soil containing viable seeds of peas give substantially complete kills of the peas.

The compounds of the invention also have utility in the study of drug effects on the central nervous system. For such uses, the compounds are administered to animals in the form of compositions comprising a compound of the invention and one or more pharmaceutical carriers. The compound can be administered orally or by injection, preferably at dosage rates from about 50 to 400 milligrams of active compound per kilogram of animal body weight. In representative operations, N-(3-chlorophenyl)-1,2-cyclobutanedicarboximide is found to protect mice from the clonic convulsions induced by the subcutaneous administration of an aqueous 0.5 percent solution of Metrazol (pentylenetetrazol) at a dosage rate of 85 milligrams per kilogram. The intraperitoneal dosage of N-(3-chlorophenyl)-1,2-cyclobutanedicarboximide effective to protect 50 percent of the mice (ED 50) in such operations is found to be 82 milligrams per kilogram.

The substituted 1,2-cyclobutanedicarboxylic anhydrides employed as starting materials herein are prepared by known procedures such as by hydrolysis of 1,2-dicyanocyclobutane in sulfuric acid hydrate to prepare 1,2-cyclobutanedicarboxylic anhydride, by hydrogenation of 3- methyl-2-cyclobutene-1,2-dicarboxylic acid followed by treatment with thionyl chloride or by hydrogenation of 3-methylene-1,2-cyclobutanedicarboxylic anhydride to prepare 3-methyl-1,2-cyclobutanedicarboxylic anhydride by the methods of Cripps et al., J. Am. Chem. Soc., 81, 4904-8 (1959), by irradiation of a mixture of 2-butyne and maleic anhydride followed by hydrogenation of the product to prepare 3,4-dimethyl-1,2-cyclobutanedicarboxylic anhydride by the method of Criegee et al., Berichte, 97, 2942-8 (1964), and by dimerization of methacrylonitrile and separation of 1,2-dimethyl-1,2-dicyanocyclobutane by the method of Albisetti et al., J. Am. Chem. Soc., 78, 472-5 (1956) followed by hydrolysis of the 1,2-dimethyl-1,2-dicyanocyclobutane in sulfuric acid hydrate to prepare 1,2-dimethyl-1,2-cyclobutanedicarboxylic anhydride.

I claim:
1. Compound corresponding to the formula

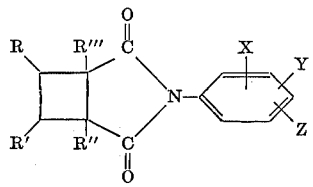

wherein R and R' each independently represent a member of the group consisting of hydrogen and methyl, R" and R''' both represent hydrogen when one of R and R' represents methyl, R" and R''' both represent a member of the group consisting of hydrogen and methyl when both of R and R' represent hydrogen, X represents a member of the group consisting of fluorine, bromine, chlorine, trifluoromethyl, dimethylamino, methylthio and methoxy, Y represents a member of the group consisting of hydrogen, trifluoromethyl, fluorine, bromine, and chlorine and Z represents a member of the group consisting of hydrogen and methoxy.

2. The compound of claim 1 wherein the compound is N-(3-chlorophenyl)-1,2-cyclobutanedicarboximide.

3. The compound of claim 1 wherein the compound is N-(3-fluorophenyl)-1,2-cyclobutanedicarboximide.

4. The compound of claim 1 wherein the compound is N-(2,4-dichlorophenyl)-1,2-cyclobutanedicarboximide.

5. The compound of claim 1 wherein the compound is N-(2,5-dichlorophenyl)-1,2-cyclobutanedicarboximide.

6. The compound of claim 1 wherein the compound is N-(4-bromophenyl)-1,2-cyclobutanedicarboximide.

7. The compound of claim 1 wherein the compound is N-(4-chlorophenyl)-1,2-cyclobutanedicarboximide.

8. The compound of claim 1 wherein the compound is N-[3,5-di(trifluoromethyl)phenyl] - 1,2 - cyclobutanedicarboximide.

9. The compound of claim 1 wherein the compound is N-(4-methylthiophenyl)-1,2-cyclobutanedicarboximide.

10. The compound of claim 1 wherein the compound is N - (4-dimethylaminophenyl)-1,2-cyclobutanedicarboximide.

References Cited

UNITED STATES PATENTS 2,900,243  8/1959  Lewis _____ 260—326X

ALEX MAZEL, Primary Examiner

J. A. NARCAVAGE, Assistant Examiner

U.S. Cl. X.R.

71—95; 260—346.3; 424—274